US005469541A

United States Patent [19]

Kingman et al.

[11] Patent Number: 5,469,541

[45] Date of Patent: Nov. 21, 1995

[54] WINDOW SPECIFIC CONTROL OF OVERLAY PLANES IN A GRAPHICS DISPLAY SYSTEM

[75] Inventors: John A. Kingman; Steven P. Larky; Michael T. Vanover, all of Austin, Tex.

[73] Assignee: International Business Machines Corporation, Armonk, N.Y.

[21] Appl. No.: 328,591

[22] Filed: Oct. 25, 1994

Related U.S. Application Data

[63] Continuation of Ser. No. 110,643, Aug. 19, 1993, abandoned, which is a continuation of Ser. No. 825,433, Jan. 21, 1992, abandoned, which is a continuation of Ser. No. 521,503, May 10, 1990, abandoned.

[51] Int. Cl.[6] .......... G06F 15/20

[52] U.S. Cl. .......... 395/158

[58] Field of Search .......... 395/157, 158, 395/155, 161; 345/119, 120

[56] References Cited

U.S. PATENT DOCUMENTS

| | | | |
|---|---|---|---|
| 4,149,184 | 4/1979 | Giddings et al. | 358/81 |
| 4,317,114 | 2/1982 | Walker | 340/721 |
| 4,555,775 | 11/1985 | Pike | 364/900 |
| 4,653,020 | 3/1987 | Cheselka et al. | 364/900 |
| 4,682,297 | 7/1987 | Iwami | 364/521 |
| 4,691,295 | 9/1987 | Erwin et al. | 364/900 |
| 4,703,317 | 10/1987 | Shimomi et al. | 340/723 |
| 4,812,834 | 3/1989 | Wells | 340/721 |
| 4,845,640 | 7/1989 | Ballard et al. | 364/518 |
| 4,970,664 | 11/1990 | Kaiser et al. | 364/521 |
| 5,237,653 | 8/1993 | Noguchi et al. | 395/158 |
| 5,263,134 | 11/1993 | Paal et al. | 395/158 |

FOREIGN PATENT DOCUMENTS

| | | |
|---|---|---|
| 0201210 | 4/1986 | European Pat. Off. . |
| 3347346 | 11/1984 | Germany . |

OTHER PUBLICATIONS

"Color-Palette Chips Bundle Extra Features with RAM Look-Up Table and DACs" by M. S. Conner, *Electrical Design News,* vol. 33, No. 20, Sep. 29, 1988, p. 67.

*Graphics Library User's Guide,* version 2.0, Document No. 007-1201-020, 1988, pp. 6-13-6-15, Silicon Graphics, Inc.

*Primary Examiner*—Phu K. Nguyen
*Attorney, Agent, or Firm*—Casimer K. Salys; Paul S. Drake

[57] ABSTRACT

Apparatus and methods for selectively controlling by graphics environment window the characteristics of an overlay common to multiple-windows while operating within the context of a conventional RAMDAC overlay control architecture. Window specific overlay control is accomplished by concatenating the window, masking and overlay data as an address to a mapping memory. The bit content of the mapping memory is controlled directly by the general purpose processor to selectively refine the relationship between the concatenated input as an address and the mapping memory output as the state conveyed to the overlay control of the RAMDAC. A common overlay is thus selectively modifiable by window.

18 Claims, 5 Drawing Sheets

Frame Buffer

Window Planes

Frame Buffer with Grid Overlay

Frame Buffer with Window Scissored Overlays

WINDOW SPECIFIC CONTROL OF OVERLAY PLANES IN A GRAPHICS DISPLAY SYSTEM

CROSS-REFERENCE TO RELATED APPLICATIONS

This is a continuation of application Ser. No. 08/110,643 filed Aug. 19, 1993, now abandoned which is a continuation of application Ser. No. 07/825,433 filed Jan. 21, 1993, now abandoned which is a continuation of application Ser. No. 07/521,503 filed May 10, 1990.

The present invention relates generally to commonly assigned co-pending patent application Ser. No. 07/223,138 filed Jul. 22, 1988.

BACKGROUND OF THE INVENTION

The present invention is directed to video display systems and more particularly to apparatus and methods for manipulating binary format data to create specific visual responses on the display. The invention finds particular application in graphics systems, where multiple forms of information are being generated, manipulated and visually portrayed to the user of the system. In such a context it is particularly useful to avoid confusing interaction between the various forms of the information being portrayed.

Computerized video graphics systems of contemporary design routinely utilize windows to portray independent blocks of information. The user of the system routinely has the power to operate within a window, operate in areas outside a window, or to relate activities of various windows.

The image portrayed on the video display of the system is normally stored in a memory array conventionally known as a frame buffer. The frame buffer is periodically scanned or otherwise accessed to ascertain the color, intensity and the like information conventionally used to generate the image on the video display itself. The image as stored in the frame buffer is associated with a window mask. Consequently, when a window is removed from view the appropriate underlying image must be regenerated in the changed region of the frame buffer.

Overlays and masks are two forms of graphics data manipulation which do not change the image as stored in the frame buffer. The advantage of such implementations is that the frame buffer does not have to be modified upon the creation or deletion of such control mechanisms. The effects of masks and overlays for each pixel position are conventionally introduced in the digital-to-analog converter, commonly referred to as a RAMDAC, which is used to convert frame buffer binary data to analog video output signals. The mask plane and overlay plane information supersedes by pixel the related data derived from the frame buffer.

A representative example of an overlay would be a blinking grid pattern which covers all or part of the video display screen. No manipulation of the image information as stored in the frame buffer is necessary yet the overlay is cyclically introduced by a frame buffer pixel location related override input into the RAMDAC.

The information representing each overlay plane is normally stored in a memory array analogous to a frame buffer, but with fewer bit planes. Consequently, the graphical effect of the overlay can be related to selected regions of the image in the frame buffer, for example, providing a grid coextensive with two windows within the frame buffer and a pop-up menu for a third window. Unfortunately, in this context, if the overlay is cycled so as to cause a blinking phenomenon on the screen, such as for the objective of drawing attention to one of the windows, the overlay blinks in all of the windows. Consequently, to provide a blinking overlay capability referenced to a window, a complete overlay plane must be consumed for each overlay pattern subject to such independent manipulation. Given the fact that overlays are usually composed of multiple bit planes and provide graphic information over the whole frame buffer image, the size of the memory associated with each overlay is significant and grows in geometric proportion to the pixel count of the screen. Therefore, it is desirable to independently relate overlay patterns to multiple windows within the context of a single overlay plane and through the use of conventional RAMDAC technology. In such a context, it would be beneficial to have, for example, a single overlay plane provide a first color grid for a first window, a second color checkered pattern for a second window, a blinking overlay in a third window and a pull-down menu in a fourth window, while using a conventional RAMDAC device.

Further background information relating to the technology of the present invention appears in the above-identified patent application as well as issued U.S. Pat. Nos. 4,317,114; 4,653,020; 4,682,298 and 4,691,295.

SUMMARY OF THE INVENTION

The present invention provides the aforementioned capability to independently relate and control overlay patterns by window while using a conventional RAMDAC device. The overlay patterns are individually linked to window patterns and masking planes in such a way that the overlays are independently controlled in relation to the associated window.

According to one practice of the invention, window patterns are related to masking and overlay plane patterns through a lookup table configured memory which maps the combination of window, masking, and overlay information to a new overlay. Manipulation, such as blinking of an overlay, is accomplished by changing the content of the relatively small mapping memory in synchronism with the desired changes.

A preferred architecture for practicing the invention includes a multiple plane associate memory array, distinct from the frame buffer, which stores window, masking, and overlay information, a dual port mapping memory, and a RAMDAC having an overlay input. The output of the associate memory array for each pixel location provides a string of bits with a defined unique address at one port of the mapping memory. The other address port of the mapping memory is under the direct control of a processor to individually define the actions of the overlays by window. The output of the mapping memory drives the overlay control of the RAMDAC. For such a configuration, the controlling processor can independently manipulate the mapping operation by window address, a manipulation which is thereafter reflected in the overlay signals received and processed by the RAMDAC in generating the video output.

The architecture and methods of the present invention facilitate operations such as window related blinking of the overlay, the ability to use masking and overlay planes interchangeably, and the ability to use such planes to manipulate palette content by window in the RAMDAC. These and other features of the invention will be more clearly understood and fully appreciated upon considering the ensuing detailed description.

DESCRIPTION OF THE PREFERRED EMBODIMENT

The features of the invention will be described in the context of a graphics video display system employing a frame buffer for storing by pixel position digital data representing the color to be generated on the video display. A graphics processor is used to generate the data stored in the frame buffer. The data in the frame buffer is periodically addressed by the display controller using a raster scan technique and then converted from digital to analog format RGB video signals using a conventional RAMDAC. In this context the RAMDAC provides one or more color palettes and is responsive to overlay control signals. Window location and priority information, masking plane information, and overlay information are stored in an associate memory array preferably configured in a multiple plane format related by pixel position to the frame buffer.

Figure 1:
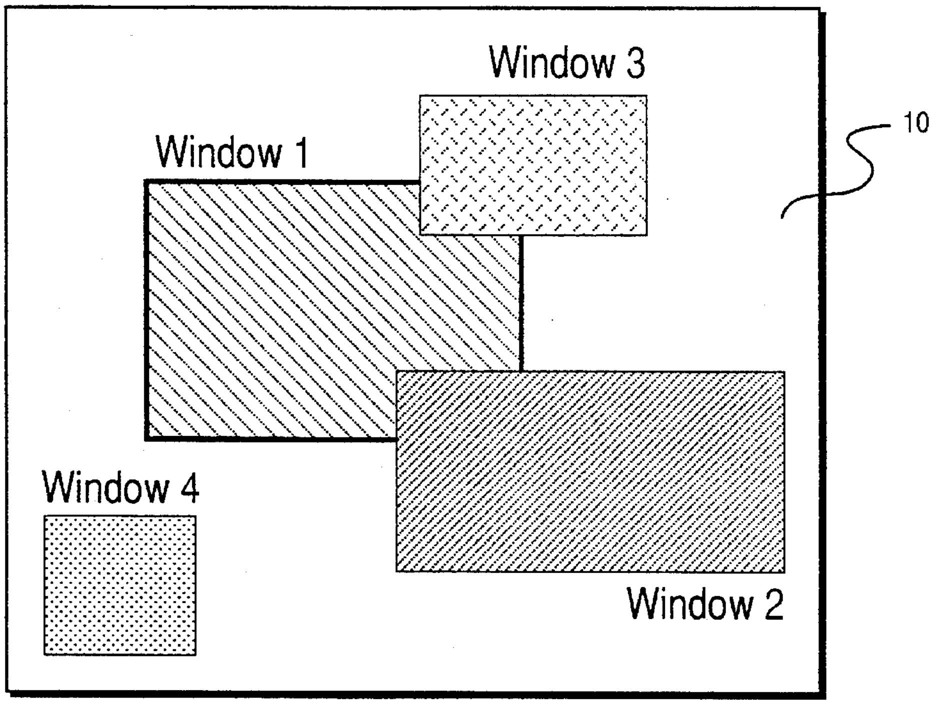
FIG. 1 is a schematic diagram of four overlapping windows as stored in a frame buffer and visually perceived on the video display.
Figure 2:
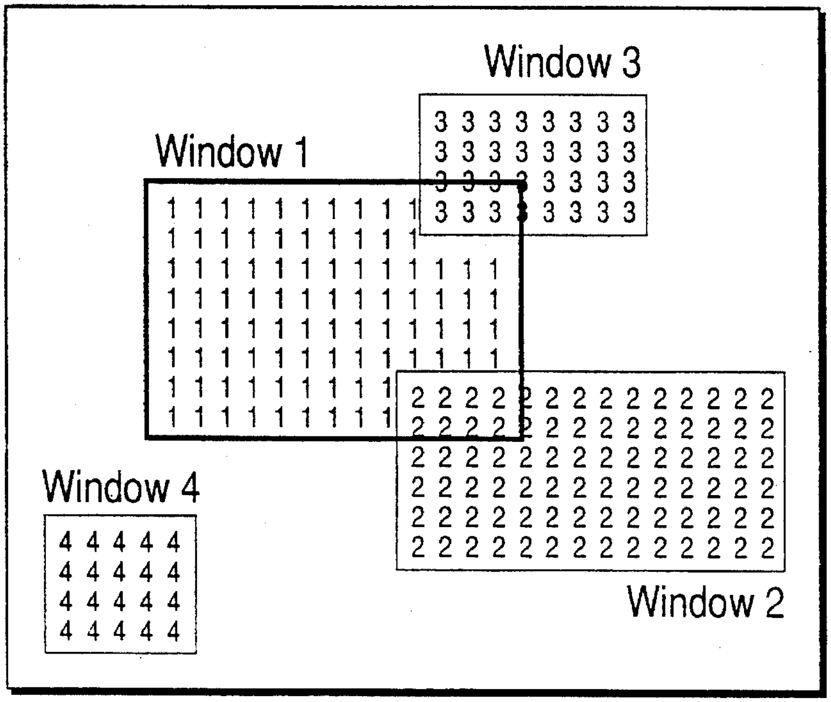
FIG. 2 is a schematic diagram of the priority of the windows represented by numerical values related to window planes.

Consider a conventional windowed screen image 10 as depicted in FIG. 1. The image patterns could represent data stored in the frame buffer or actually generated on a video display screen. The image is composed of a background region 1 and four individually numbered windows. The priority of the windows is such that windows 2 and 3 overlap and obstruct window 1, such priorities being expressly shown by numerical values in FIG. 2 of the drawings.

In the context of this example, the associate memory array would include for each pixel position of image 10 the binary data representing the hierarchy of the associated window. Preferably, the window information would be stored in 4 bit planes, suitable thereby to differentiate between 16 windows for each pixel position. The invention further contemplates that the associate memory include two additional bit planes, individually allocated to masking functions but by virtue of the present invention fully capable of being used as overlays. And finally, a last two bit planes performing the overlay function. Consequently, the depth of the associate memory would be 4+2+2=8 bits for each pixel position. As thus defined, the associate memory contains information differentiating 16 windows, 2 masking planes and 2 overlay planes.

Figure 3:
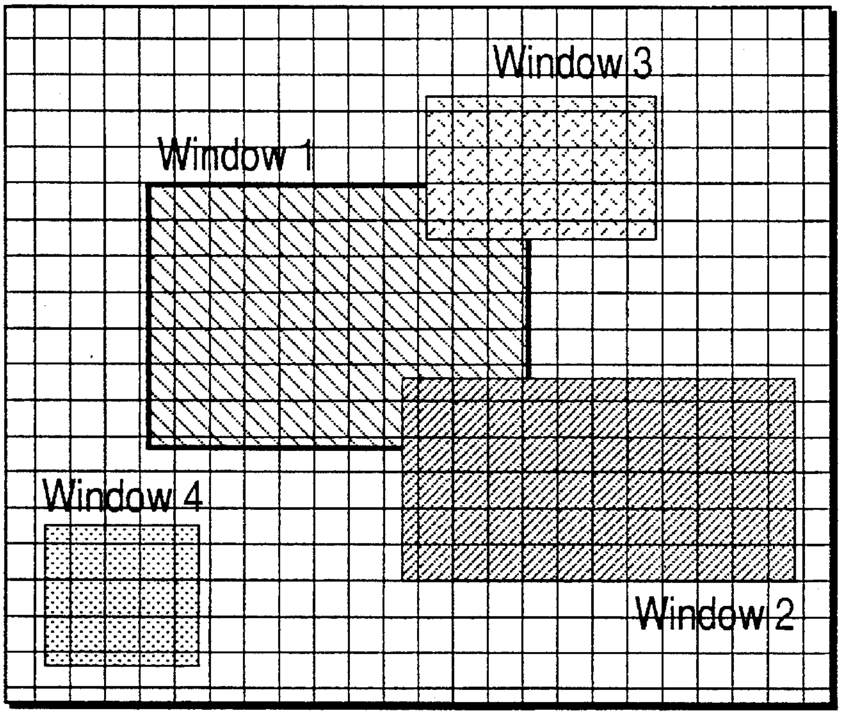
FIG. 3 is a schematic depiction of the windows in FIG. 1 with a grid overlay of the full content in the frame buffer.
Figure 4:
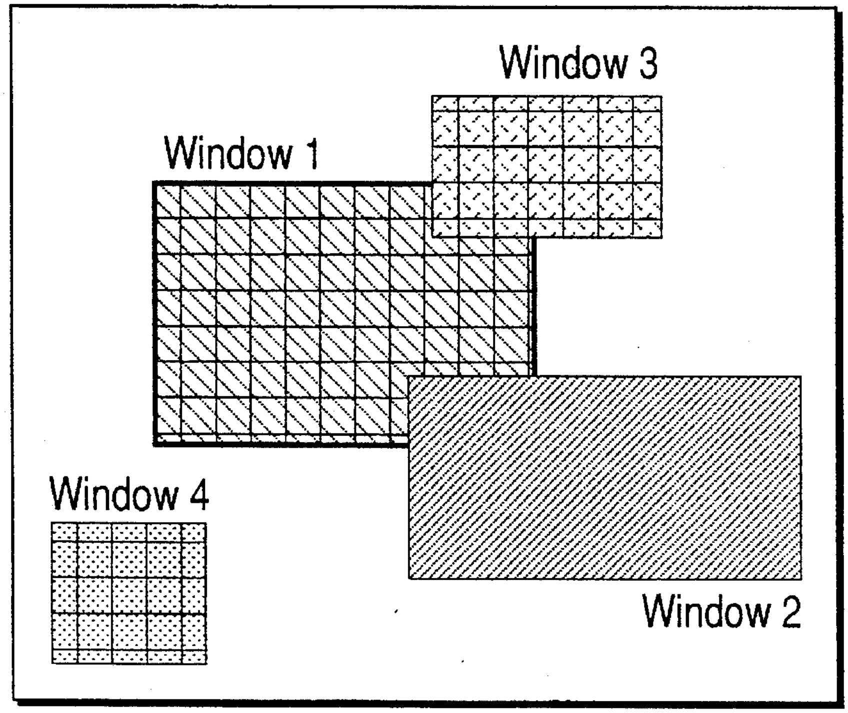
FIG. 4 is a schematic representation of the frame buffer with the overlay scissored-to windows 1, 3 and 4.

An overlay, such as the grid pattern depicted in FIG. 3, can be placed over the whole of the display pattern or, as shown in FIG. 4, related to specific windows of the display. This selected link between the overlay pattern and one or more windows in the display is readily accomplished by relating the overlay patterns to selected window patterns. The problem with the prior art arises when one seeks to blink or otherwise manipulate the overlay within the boundaries of one window without doing likewise for the other windows using the same overlay plane. This selectivity is desirable in situations where the blinking or other change of the overlay characteristics are used to relate information such as processing status or cursor position. Since each overlay plane is treated as a unit in a conventional RAMDAC, the blinking action occurs for all locations of the overlay plane. The invention provides a means for individually manipulating overlays within the individual windows without requiring a separate overlay plane for each window or mandating a new RAMDAC architecture.

The invention focuses on the manipulation of data as it appears in the associate memory array to individualize by window the control of window associated overlays. In general, this has been accomplished by recognizing that the bits in the associate memory representing every possible combination of the overlay planes and the protection planes by pixel defines a single and unique address which can be remapped, and thereby subject to individualized manipulation, by altering the mapping transformation. The mapping is preferably implemented through the use of a dual address port mapping memory, the memory having one input responsive to a concatenation of the data in the associate memory for a pixel position and the other address port responsive to an address generated by the processor controlling manipulation. The output of such mapping memory is an overlay control signal, whose characteristics are a combination of the window, protection and overlay data as selectively modified by the general processor.

The invention originates from the recognition that there exists a unique mappable relationship between the overlays and the window addresses. Thus, according to the invention, a mapping memory can be defined to uniquely relate an 8 bit address representing the composite window, masking and overlay information for a single pixel to a mapping memory output representing the desired characteristic of the pixel as applied to the overlay input of the RAMDAC. The mapping memory of the invention lends itself to selective manipulation in the transformation. With this architecture a conventional general purpose processor can selectively modify window specific data to change by window the overlay input to the RAMDAC. For example, the mapping memory data can be cycled to create the aforementioned blinking phenomenon. As a variant thereof, where the RAMDAC has a capability to select palettes, the architecture of the present invention also allows the general purpose processor to change the palette information for an overlay cut or scissored to a specific window.

Figure 5:
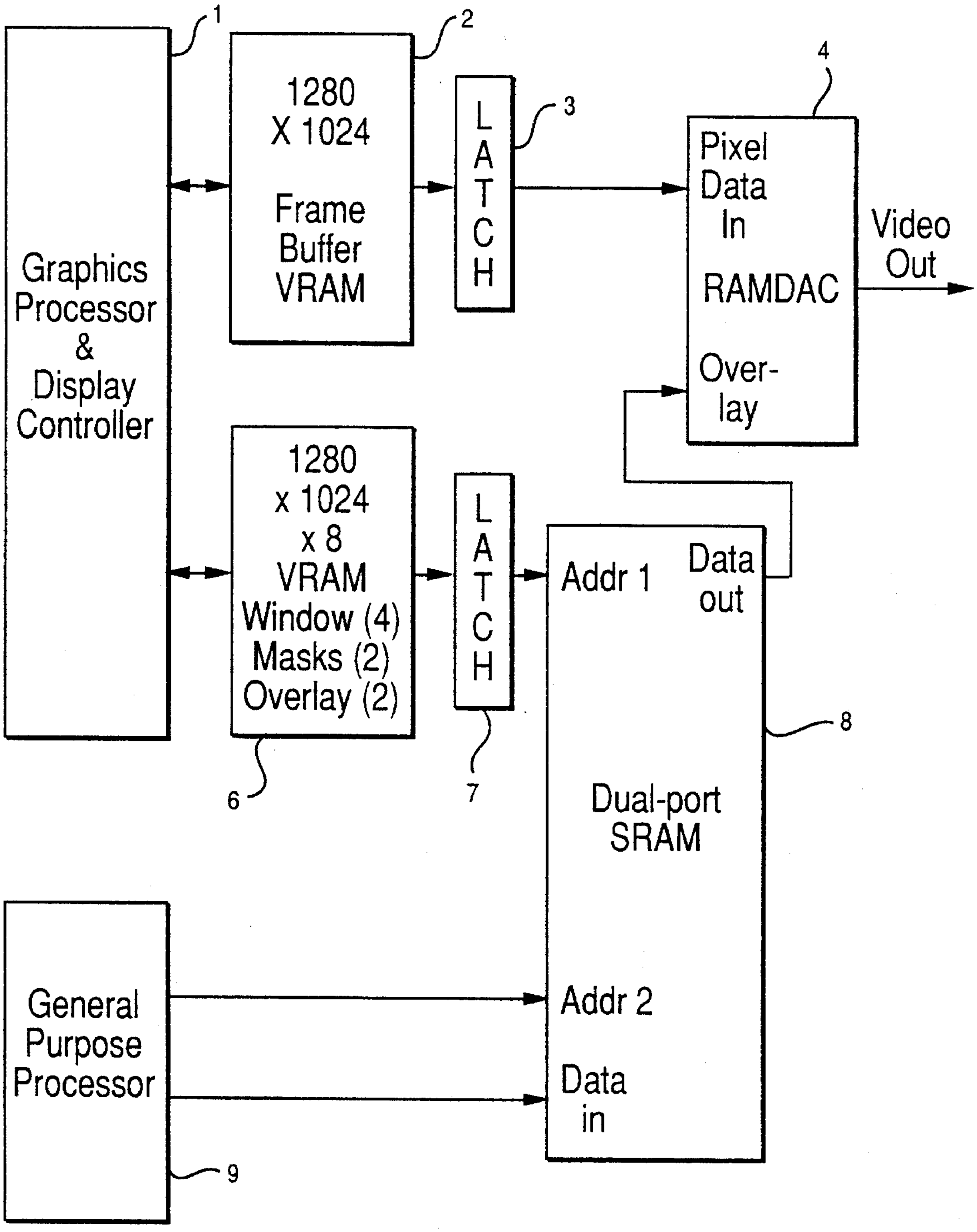
FIG. 5 is a schematic block diagram showing the location and relationship of the mapping memory to the RAMDAC, the associate memory array storing the window, mask and overlay information, and the processor which manipulates the mapping operation.

FIG. 5 is a schematic block diagram of the basic graphics system to which the invention pertains. As depicted therein, a graphics processor and display controller 1 communicates with VRAM frame buffer 2 to provide via latch 3 the binary format pixel data to the input of RAMDAC 4. The VRAM associate memory 6 is also controlled by graphics processor and display controller 1, storing therein by plane binary data representing window, mask and overlay information. Note that frame buffer 2 and associate memory 6 are 1280×1024 memory arrays, with the latter configured in eight planes so as to have four planes of window information, two planes of mask information and two planes of overlay information. The depth of the frame buffer is at the discretion of the designer, with a typical of 24 to provide 8 bits for each of the colors R, G and B. The invention differs from the prior art in that the output data from associate memory 6 is used as an address to mapping memory 8. Mapping memory 8 is preferably configured as a dual port static RAM, with one address port receiving the output of associate memory 6, synchronized via latch 7, and the other address port receiving selective address signals from general purpose processor 9. Addresses emanating from general purpose processor 9 identify the storage locations for the data provided by processor 9 to mapping memory 8. The output from mapping memory 8 is conveyed to the overlay input of RAMDAC 4. The overlay input is not limited merely to on/off manipulation of the pixel data coming from the frame buffer, but can as noted earlier encompass overlay type control of palettes and the like.

Though the function performed in block 1 would commonly be provided by a custom designed device, the Texas Instruments TMS 34010 or TMS 34020 has suitable capabilities. Toshiba 524-268 is representative of the VRAM devices used in frame buffer 2 and associate memory 6. The functions performed in RAMDAC 4 are typical of those available in a BT 461 device manufactured by Brooktree. The Cypress CY7C 142 part is representative of the dual port SRAM identified as block 8. The general purpose processor function attributed to block 9 can be performed by a Texas Instruments processor identified as TMS 320C30.

Figure 6:
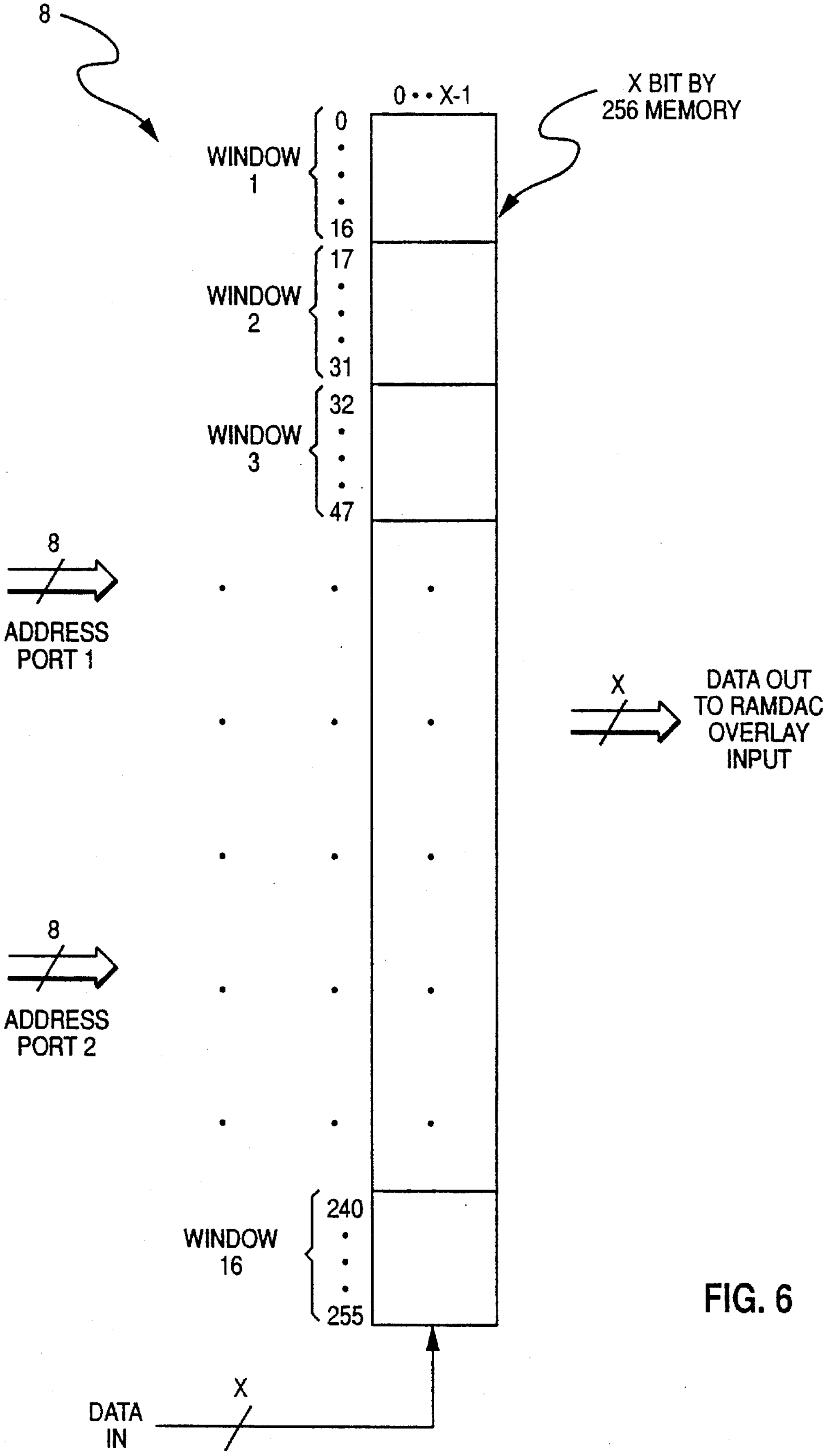
FIG. 6 is a schematic diagram representing the functional architecture of the mapping memory.

A particularized transformation architecture for mapping memory 8 is depicted in FIG. 6 of the drawings. Given that the input address is composed of 8 bits of concatenated window, masking, and overlay plane data from associate memory 6 (FIG. 5), mapping memory 8 is an X×256 array grouped by addresses in relation to windows 1 to 16. An 8 bit address at port 1 produces an X bit data output, which output is the signal to the overlay input connection of RAMDAC 4 (FIG. 5). Data is written into mapping memory 8 via the X bit wide DATA IN line and is stored at the address supplied to port 2. This arrangement is particularly efficient for implementing overlay control in that the number of bits subject to change is related to the number of windows rather than the number of pixels within a window.

Figure 7:
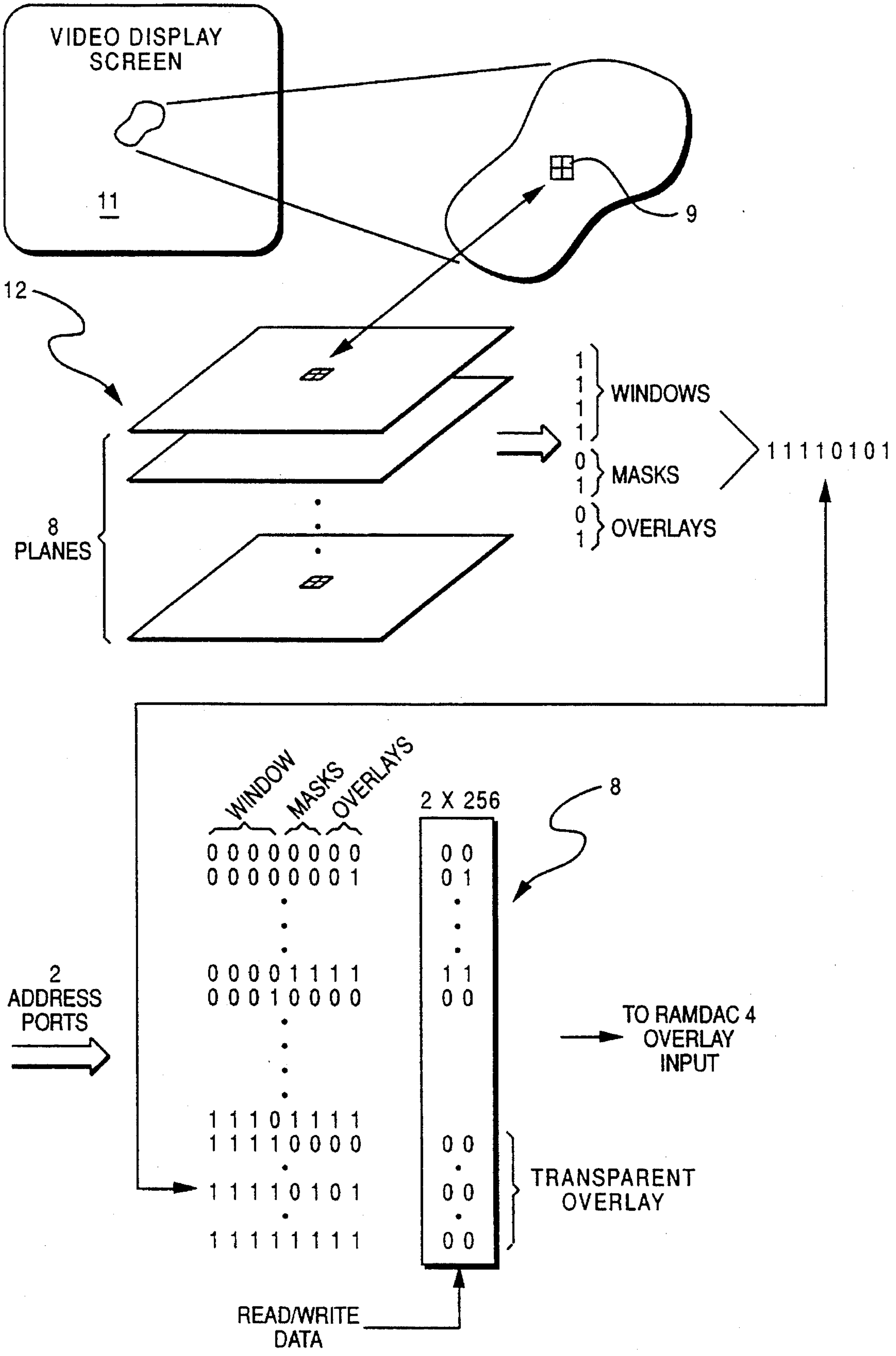
FIG. 7 is a schematic diagram portraying the relation of a pixel position on a display screen to overlay data in the mapping memory.

FIG. 7 portrays by schematic diagram the relation of a pixel 9 on video display screen 11 to the window/mask/overlay planes 12, the data stored in such planes, and the interaction of such data with dual port RAM 8 to provide window selectable overlay information to RAMDAC 4 (FIG. 5). According to the particularized design depicted in FIG. 7, dual port RAM 8 is prescribed to be 2×256 in size, so as to provide to the RAMDAC overlay input one of four bit combinations (00,01,10,11). Typically the 00 combination will represent a transparent overlay, effectively disabling any overlay. The remaining three states of the overlay input are defined by the user and consequently may involve masking or color functions. In the context of this depicted mapping memory, note that the data for pixel position 9 as stored in the eight planes 12 is defined by the example to be a string of bits 11110101, wherein the first four bits define one of sixteen windows, the next two bits define the four masks, and the remaining two bits define the overlays. This string of bits defines an address within the group of sixteen for widow 1111, an address which was previously written by general purpose processor 9 (FIG. 5) to have a 00 bit combination. Consequently, upon mapping the data for pixel position 9 in the eight planes 12 through mapping memory 8 the RAMDAC 4 is provided a 00 bit combination, representing transparency. Thereby, overlay data, and the mask data of so desired, are mapped through the dual port memory to accomplish window specific manipulation of the information conveyed to the RAMDAC by general purpose processor 9 (FIG. 5). It is particularly noteworthy that the size of mapping memory 8 is small in relation to the memory planes 12. Thus window specific linking can be accomplished by writing small groups of data into mapping memory 8 in timed succession and without modifying significantly larger base of data stored in the planes 12.

Note that the overlay data conveyed to the RAMDAC can be manipulated directly by the general purpose processor in direct relation to a window. Foremost, this flexibility is accomplished within the context of a conventional RAMDAC architecture.

The use of a mapping memory architecture to implement overlays provides indirect benefits as to system flexibility. The lookup VRAM by which mapping is accomplished allows masking and overlay planes to be used interchangeably with full masking or overlay capability available individually by window. Secondly, multiple planes can be combined to maximize the available variables, e.g., choices of overlay colors, by eliminating redundant states.

The invention thus provides for the use of a mapping memory and direct mapping state manipulation by a general processor to temporally and spatially manipulate masking and overlay conditions in relation to system defined window areas while utilizing conventional RAMDAC devices. The structures and methods of the present invention also provide versatility and the interchangeability of mask and overlay data as well as expanded capability to individually and selectively manipulate overlays in unmasked windows.

Though the invention has been described and illustrated by way of specific embodiment, the methods and structures should be understood to encompass the full scope of practices defined by the claims set forth hereinafter.

We claim:

1. An apparatus for relating overlay patterns to defined regions in a video display system, comprising:

frame buffer means for defining first and second regions in a display pattern of pixels subject to display;

overlay pattern means for defining an overlay pattern of pixels common to the first and second regions, said overlay pattern being stored independent of said display pattern, each overlay pattern pixel corresponding to at least one display pattern pixel without a plurality of overlay pattern pixels corresponding to pattern pixel;

controlling means, coupled to said overlay pattern means for selectively controlling visibility of the defined independently stored overlay pattern of pixels in the first and second regions; and means, coupled to said frame buffer means and controlling means, for combining signals from said frame buffer means and said controlling means for display of an overlay pattern pixel or a display pattern pixel at each pixel of said first and second regions at all times.

2. The apparatus recited in claim 1, further comprising:

means for storing the pattern subject to display.

3. The apparatus recited in claim 2, wherein the first and second regions are windows.

4. The apparatus recited in claim 3, wherein the means for storing comprises a frame buffer memory storing background and window characteristics.

5. The apparatus in claim 4, wherein the means for defining an overlay pattern comprises a memory for storing window address and overlay visibility characteristics.

6. The apparatus recited in claim 5, wherein the means for selectively controlling comprises a means for mapping window address and overlay visibility characteristics to overlay control signals.

7. The apparatus recited in claim 6, wherein the window address and overlay characteristics subject to mapping are related to addresses for selecting the background and window characteristics stored in the frame buffer memory.

8. The apparatus recited in claim 7, wherein the overlay control signals and frame buffer memory stored characteristics are combined in a digital-to-analog converter.

9. A system for controlling overlays in a windowed graphics display system, comprising:

a frame buffer memory for storing display pattern pixels for scanned display;

a memory for storing an overlay pattern of pixels including window address and overlay visibility characteristics, Said overlay pattern of pixels being stored independent of said display pattern pixels, each overlay pattern pixel corresponding to at least one display pattern pixel with a plurality of overlay pattern pixels corresponding to any single display pattern pixel;

mapping means, coupled to said memory, for selectively mapping stored window address and overlay visibility characteristics of the overlay pattern pixels to the display pattern pixels stored in the frame buffer memory; and means, coupled to said frame buffer memory and said mapping means, for combining selectively mapped stored window address and overlay visibility characteristics in synchronism with a scan of the pattern in the frame buffer memory for display of an overlay pattern pixel or a display pattern pixel at each pixel located in a window at all times.

10. The apparatus recited in claim 9, wherein the means for selectively mapping is a memory relating by address the window address and overlay visibility characteristics to overlay control signals provided to the means for combining.

11. The apparatus recited in claim 10, wherein the means for combining is a digital-to-analog converter.

12. A method for selectively controlling overlap in a windowed graphic display system, comprising the steps of:

storing background and window pattern pixels in a frame buffer memory;

storing overlay pattern pixels including window location and overlay visibility characteristics in a first memory, said overlay pattern pixels being stored independent of said window pattern pixels, each overlay pattern pixel corresponding to at least one window pattern pixel without a plurality of overlay pattern pixels corresponding to any single display pattern pixel;

storing in a second memory, coupled to said first memory mapping information for relating the window location and overlay visibility characteristics of each overlay pattern pixel to at least one background and window pattern pixel;

selectively modifying information stored in the second memory; and generating a composite graphics display system signal by synchronously combining window location and overlay visibility characteristics as modified in the second memory with background and window patterns for display of an overlay pattern pixel or a window pattern pixel at each pixel located in a window at all times.

13. The method recited in claim 12, wherein said step of generating is accomplished by synchronously scanning the memories for combination in a digital-to-analog converter.

14. An apparatus for relating overlay patterns to defined regions in a video display system, comprising;

frame buffer means for defining a plurality of regions, each region containing a regional pattern of pixels subject to display;

overlay pattern means for defining an overlay pattern of pixels and relating said overlay pattern to a plurality of said regions, said overlay pattern allowing portions of said related regional patterns to be displayed through the overlay pattern, said overlay pattern pixels being stored independent of said regional pattern of pixels, each overlay pattern pixel corresponding to at least one regional pattern pixel without a plurality of overlay pattern pixels corresponding to any single regional pattern pixel;

controlling means, coupled to said overlay pattern means, for selectively controlling visibility of said defined overlay pattern by related region;

means, coupled to said frame buffer means and said controlling means, for combining signals from said frame buffer means and said controlling means for display of an overlay pattern pixel or a regional pattern pixel at each pixel of said first and second regions at all times.

15. The apparatus of claim 14 wherein said regions are windows.

16. The apparatus of claim 15 further comprising means for storing said regional patterns subject to display.

17. The apparatus of claim 16 further comprising means for storing said defined overlay pattern independent of said related regional patterns.

18. The apparatus of claim 17 wherein said means for selectively controlling includes means for storing overlay visibility characteristics of said overlay pattern by related region.

* * * * *

UNITED STATES PATENT AND TRADEMARK OFFICE

CERTIFICATE OF CORRECTION

PATENT NO. : 5,469,541

DATED : November 21, 1995

INVENTOR(S) : John A. Kingman, Steven P. Larky and Michael T. Vanover

It is certified that error appears in the above-indentified patent and that said Letters Patent is hereby corrected as shown below:

Col. 1, line 10, delete "1993" and insert --1992--;

Col. 3, line 12, delete "scissored-to" and insert --scissored to--;

Col. 6, line 45, after "to" and insert --any single display--;

Col. 7, line 16, delete "Said" and insert --said--; and line 19, delete "with" and insert --without--.

Signed and Sealed this

Second Day of July, 1996

Attest:

BRUCE LEHMAN

Attesting Officer

*Commissioner of Patents and Trademarks*